Jan. 25, 1966    E. M. GRIMM ETAL    3,230,902
DEVICE FOR MAKING BLOCKS OF
VEGETABLE, ANIMAL, OR
MINERAL MATTER
Filed Jan. 11, 1962    3 Sheets-Sheet 1
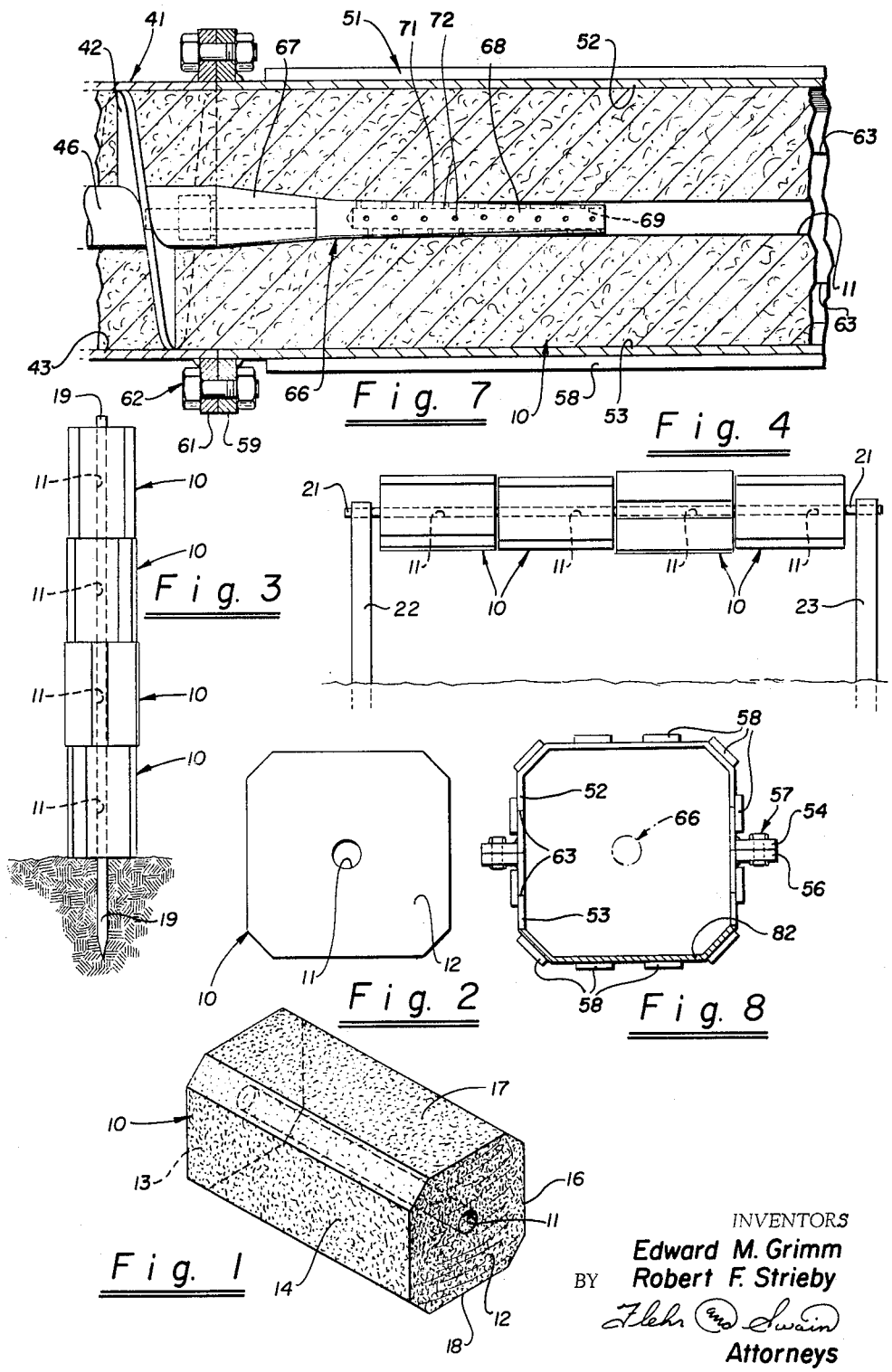
INVENTORS
Edward M. Grimm
Robert F. Strieby
BY
Attorneys INVENTORS
Edward M. Grimm
BY Robert F. Strieby
Attorneys

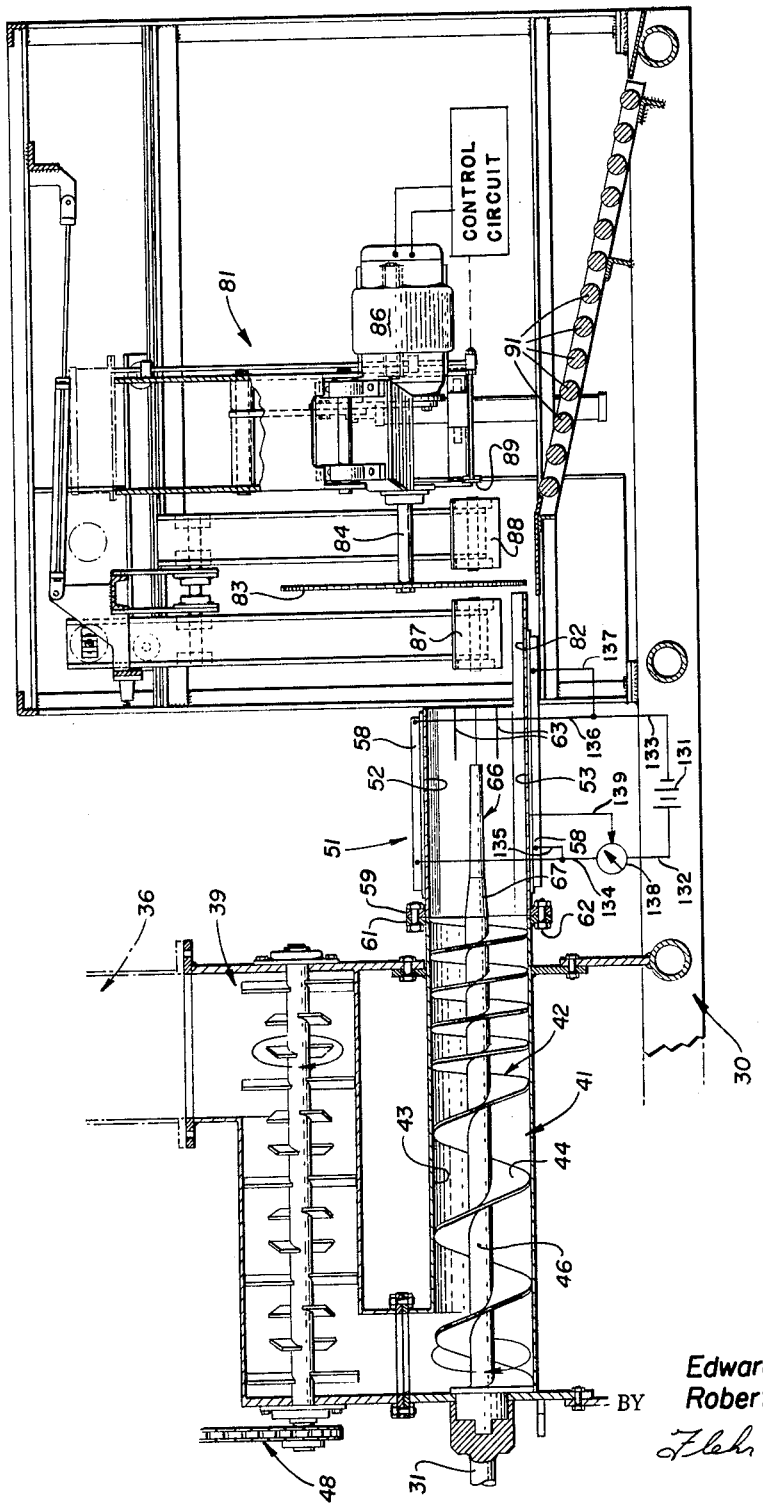

United States Patent Office 3,230,902
Patented Jan. 25, 1966

3,230,902
DEVICE FOR MAKING BLOCKS OF VEGETABLE,
ANIMAL, OR MINERAL MATTER
Edward M. Grimm, Manila, Philippines, and Robert F. Strieby, Tooele, Utah, assignors to Constantflo Machinery Co., Incorporated, Salt Lake City, Utah, a corporation of Utah
Filed Jan. 11, 1962, Ser. No. 166,460
3 Claims. (Cl. 107—14)

This invention relates to apparatus for making a block.

More particularly it relates to an apparatus for making a block of animal feed which is preferably provided with a hard exterior and which is also provided with a hole extending from one side to the other whereby the same may be readily mounted for feeding purposes.

The exterior of the block is preferably provided with a smooth substantially glazed surface which, in addition to rendering the same more attractive, enhances its waterproof and weatherproof characteristics.

Moreover, a block made with our apparatus includes a hole extending from one wall thereof through the opposite wall, and is ideally suited for use in the feeding of cattle. A number of such blocks may be placed upon a stake, one upon the other, with the stake extending through the aligned holes. In addition to supporting the blocks from the ground, this method of presenting feed to cattle insures that when one block has been eaten, another block will fall to the proper position for subsequent feeding. While we have suggested that the blocks be mounted on a vertical post, it is apparent that a number of these blocks may be mounted upon a horizontally disposed member so that they may be maintained in suitable feeding position above the ground or above the snow, for example.

In addition, a block made by our apparatus is rectangular in cross section and may be of any desired length. Blocks of this kind may, therefore, be stored in a minimum cubic area.

Blocks having the above characteristics are preferably produced by our method of compressing, heating and relieving the mass as will more fully hereinafter be described; that is, (1) by heating the compressed mass or block either by applying heat to the exterior from an external source, or by elevating the temperature by urging the same through a die whereby the heat generated by the frictional engagement between the die and the block will serve to heat the same, or by a combination of the two, and (2) by relieving the interior of the block during its formation by permitting the escape of accumulated heat in the form of steam through the hole or bore previously described.

Blocks, manufactured in accordance with the above method possess the characteristics previously outlined herein and are sufficiently hard to be handled easily without fear of their being broken.

The apparatus for manufacturing blocks of this kind according to our method consists generally of means for adequately mixing the ingredients and then forcing the same into a die of a particular design and possessing particular characteristics all as will more fully hereinafter be explained.

From the foregoing, therefore, it is apparent that it is a principal object of our invention to provide apparatus for making block of feed material possessing certain characteristics, including, among others, a hardened exterior and a centrally disposed bore or hole by which the block may be supported; to use a method in the production of such blocks utilizing the steps of compressing the mass, heating the exterior and relieving the interior of the mass; and producing a block by the above method in a particular die assembly which will more fully hereinafter be described.

More particularly our invention relates to apparatus for making block which may be made of vegetable, animal, or mineral matter and while we describe the same primarily as a feed block it is of course to be understood that it may be formed of any material and for substantially any purpose. More particularly, however, these blocks may be composed of any materials, including such ingredients as are commonly referred to as binders, if and as they may be needed to help in adapting such materials to be compressed in a continuous manner and cut into blocks of predetermined length.

Many methods and devices have been used to make blocks of various kinds in the past and in most instances it has been found advantageous to design a piece of equipment for each particular type of block and method used to produce the same. For example, concrete blocks have been extruded in many configurations. Blocks of other materials have been extruded for various purposes and our invention is particularly adapted to be used in connection with the manufacture of so-called protein blocks, mineral blocks, salt blocks, or other rations which may be blocked for the eventual feeding of animals.

Customarily, protein blocks are made of approximately 45 percent cotton seed or soybean meal, 15% salt, 4 to 6% urea, 5 to 10% dicalcium phosphate and 10 to 15% molasses. Mineral blocks customarily contain 7% molasses and 93% mineral salt. Other formulations will be described further in this specification. In each instance, however, the proportions which we set forth herein are approximate only and we do not intend that our blocks, or the method of making the same, or the machine which will be described, be limited to these specific proportions or these specific elements. They are used as illustrative only.

In the past, when blocks of this kind have been formed, the components have been mixed and then introduced into a die where they have been compressed. The die is then stripped from the block or the block is pushed from the die after removing one end. These steps require time and labor. We wish to form blocks of this kind by a method and apparatus which will permit their being formed continuously. Prior efforts to block materials which are not of a fluid nature, through an extrusion die have failed because the mass tends to clog the extrusion die. For example, we have found that in the event the forming die consists merely of an exterior die element positioned immediately adjacent the end of a screw conveyor, for example, the mass clogs the die and the material will not be extruded therefrom. As a matter of fact in some of our experiments we have determined that the blocking will be so complete that the screw conveyor will be prevented from rotating.

In addition, therefore, to the objects previously enumerated herein, we provide an apparatus which may be utilized for the production of protein or mineral and animal blocks of the type described, which will permit the continuous manufacture of these blocks without the clogging or stoppage of the equipment.

These and other objects and advantages of our invention will appear from the following specification taken in conjunction with the accompanying drawings in which:

FIGURE 1 is a view of a block manufactured by the machine disclosed herein.

FIGURE 2 is an end view of the block illustrated in FIGURE 1.

FIGURE 3 shows a plurality of blocks mounted upon a vertical stake for feeding purposes.

FIGURE 4 illustrates a plurality of our blocks mounted upon a horizontal support for feeding purposes.

FIGURE 6 is a partial cross-sectional view of the device illustrated in FIGURE 5 illustrating particularly the screw conveyor and the die assembly.

FIGURE 7 is an enlarged cross-sectional view of the die assembly illustrated in FIGURE 6 showing a block positioned therein.

FIGURE 8 is a cross-sectional view of the die illustrated in FIGURE 5 and taken along the line 8—8 of FIGURE 5.

Figure 5:
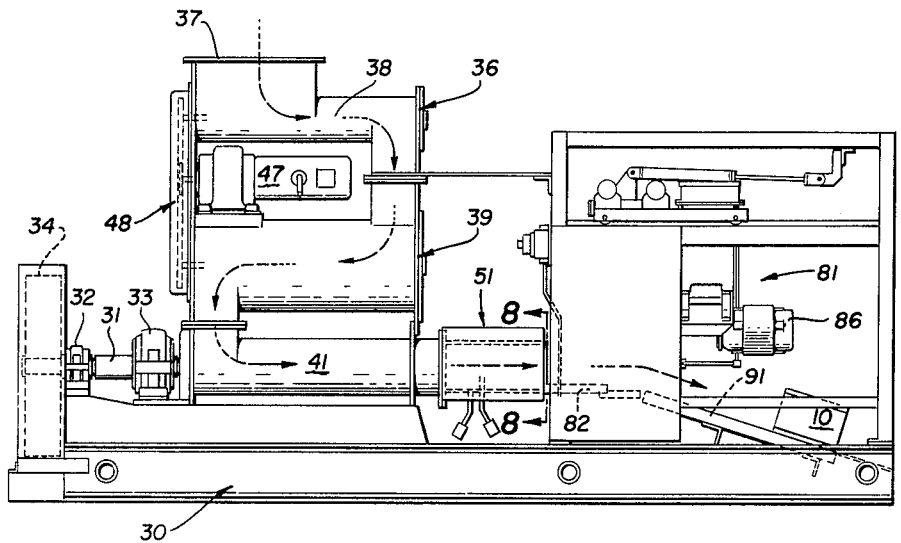
FIGURE 5 is a side view of a device adapted to be used in connection with our method to produce blocks of the type illustrated in FIGURES 1 to 4, inclusive.
Figure 9:
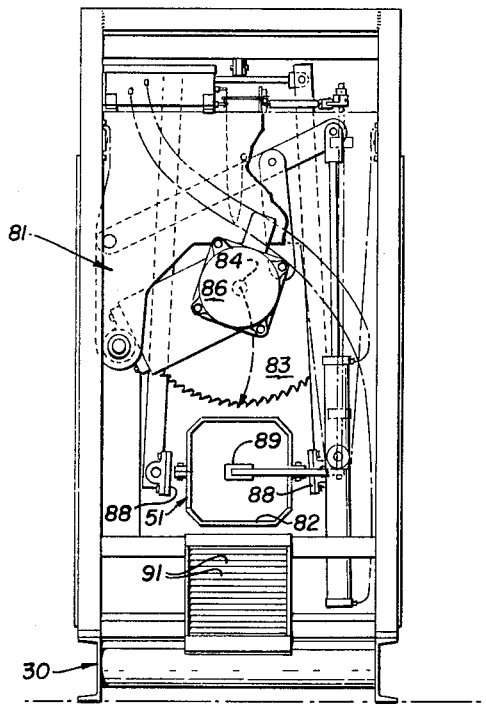
FIGURE 9 is an end view of the cut-off apparatus illustrating the saw in retracted position.
Figure 10:
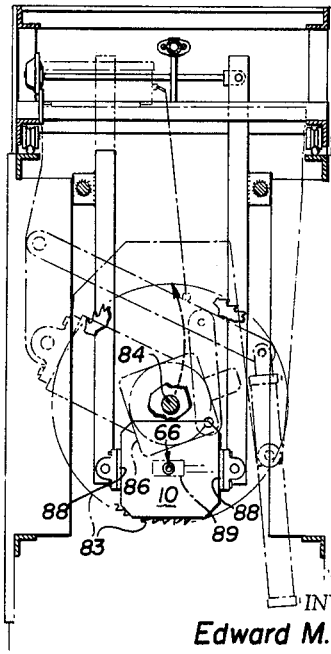
FIGURE 10 is a view similar to that of FIGURE 9 illustrating the saw in a position at which it will have completed a cutting cycle.

As illustrated particularly in FIGURE 1, our block is a mass 10 which may be of any particular cross-sectional configuration desired but which, as illustrated in FIGURES 1 and 2, conforms generally to the cross-sectional form of the die illustrated in FIGURE 8 and is more or less square in cross section. It will be noted that a longitudinally disposed hole or bore 11 extends from face 12 to face 13 and is substantially centrally disposed between the side walls 14 and 16 and the top and bottom walls 17 and 18. A plurality of blocks of the type illustrated in FIGURE 1 are adapted to be mounted upon a vertical stake 19, for example, as illustrated in FIGURE 3. The bores 11 in the vertically placed blocks 10 are aligned and accommodate the stake 19. As one of the lower blocks is eaten away, the upper blocks tend to move downwardly along the stake 19, always presenting a new feeding surface.

Also, as illustrated in FIGURE 4 blocks 10 are adapted to be supported on a horizontal member 21 which may be supported at some distance above the ground in any suitable manner as, for example, upon a pair of vertical support members 22 and 23. The height of the member 21 from the ground may vary. The aligned bores 11 in the blocks 10 are adapted to receive the member 21.

The exterior surface of the block illustrated in FIGURES 1 through 4, inclusive, is preferably hardened or glazed to enhance the waterproof and weatherproof characteristics and qualities of the blocks.

The density of the blocks will depend upon the nature of the ingredients and the use to which the block is to be put.

The method of producing our block may best be disclosed in conjunction with a preferred equipment which has been designed to produce blocks of the type illustrated in FIGURES 1 through 4, inclusive, in accordance with our method.

As illustrated in FIGURES 5 through 10, our device is provided with a base 30 which supports at the extreme left-hand end, as illustrated in FIGURE 5, a suitable drive shaft 31 mounted in suitable bearing block assemblies 32 and 33. The shaft 31 is connected to a pulley 34 which, through suitable belting, not shown, is connected to an electric motor, not shown, which is adapted to drive the shaft 31.

The base 30 also supports a feeding and mixing assembly 36 which consists generally of an input hopper 37 through which material may be fed into a feeding and mixing device 38 which consists generally of a variable pitch conveyor screw in a suitable housing. Some mixing of the ingredients occurs herein but is primary purpose is to assure a steady and uniform flow of materials through a similar device 39 and into screw-conveyor member 41. Member 41 is shown in greater detail in FIGURE 6 and consists generally of screw element 42 mounted in substantially tubular housing 43. Screw 42 consists of flight 44 mounted on an axially disposed shaft 46. Devices of this kind are well known and require no further description. Member 39 is designed to receive, and adequately mix, fluid additives such as molasses, water, binders, etc. to the material fed therein through members 37 and 38.

The asembly 36 also includes means for driving the feed mechanisims 38 and 39 and we provide a variable speed motor 47 which, through suitable chain or belt drive assembles 48, actuate the screws within members 38 and 39 whereby the flow of feed therethrough can be regulated.

The combination of mixers and feeders and the means of operating them is subject to mechanical preference and the embodiment illustrated herein does not constitute a limitation or restriction on our invention. It is sufficient only that the ingredients be intimately mixed and be delivered to the die 51 continuously and at the desired pressure. A typical mixture which we have used has a mass of about 2½ cubic feet per hundred pounds of material. Once compressed, a cubic foot block weighs about 81 pounds. Thus we compress the material at a ratio of about two to one. This compression, however, may vary with different materials.

As illustrated more particularly in FIGURES 6 and 8, the die 51 consists of an outer housing consisting of substantially identical shell members 52 and 53 which are provided with mating flanges 54 and 56 by which they can be secured together by virtue of nut and bolt assemblies 57. The shape of the members 52 and 53 may vary from that illustrated in FIGURE 8, for example, but we have found that this shape provides a satisfactory block 10. Heating elements 58 are secured to the outer walls of the shells 52 and 53 and they extend the length of the die formed. The heating elements 58 are connected to a suitable source of electric current and are thermostatically controlled to provide predetermined heat to the exterior of the die 51.

Thus the opposite poles of a battery 131 are connected by leads 132, 133 respectively to heater elements 58 as by parallel connections 134, 135 fed by lead 132 and the parallel connections 136, 137 fed by lead 133. A thermostat 138 is connected via connection 139 to sense the temperature of element 58 and control current flow in the D.C. circuit including battery 131, lead 132, connection 135, element 58, connection 137 and lead 133. Thermostat 138 will, of course, also control current in other heater elements 58 connected in parallel with connections 135, 137, such as that heater element 58 shown on the top of the die in FIGURE 6.

The die 51 is provided with an annular end flange 59 which is adapted to mate with a similar flange 61 on the outflow end of the conveyor 41 and to be secured thereto by suitable nut and bolt assemblies 62. The die 51 is also provided with parallel slots 63, as illustrated generally in FIGURE 6, adjacent the outlet end of die 51, providing, in effect, a plurality of relatively broad resilient heated fingers. The shaft 46 terminates in a plane generally defined by the end of the member 41. However the shaft 46 also supports a conically tapered core assembly 66 which is best illustrated in FIGURE 7. The core assembly 66 is preferably rotatably mounted at the end of shaft 46 although the connection of the core assembly 66 to the shaft 46 is not important as our device may be operated when it is secured to the shaft 46 in such a manner that it does not rotate.

Core 66 consists of a sharply tapered portion 67 and a less sharply tapered portion 68. By varying the length and angle of the tapers, an operator can vary the density of the block produced.

The portion 68 may either be solid or may, as viewed in FIGURE 7, be provided with a coaxially aligned bore 69 whose wall 71 may be provided with orifices 72 whose purpose will more fully hereinafter be described. The core 66 forms the centrally disposed bore 11 in the block 10.

The mix is fed continuously into the die 51. The walls of the die 51 are maintained at a predetermined temperature as desired by the operator. We have found that the temperature applied to the heating elements 58 depends upon the density of the block desired and the type of material of which the block is made. For example, the heat applied will vary as shown in the following formulation:

For example no heat was applied to the walls of die 51 in the formation of a so-called 20% formula protein block as follows:

*Formula 1.—No heat used, 20% protein*

| | Lbs. |
|---|---|
| Soybean meal | 550 |
| Wheat mids | 480 |
| Yellow corn | 400 |
| Dehydrated alfalfa meal | 50 |
| Salt | 300 |
| Molasses | 100 |
| Dicalcium phosphate | 65 |
| Wheat germ | 20 |
| Calcium carbonate | 20 |
| Vit. A | 13 |
| Ru V Ade | 2 |
| | 2000 |

With the following formula for a 37% formula protein block, the side walls of die 51 were maintained at 180° F.

*Formula 2.—180 degrees heat used, 37% protein*

| | Lbs. |
|---|---|
| Cottonseed meal | 600 |
| Soybean oil meal | 450 |
| Salt | 350 |
| Calcium carbonate | 200 |
| Gluten feed | 175 |
| Urea | 120 |
| Meat scraps | 50 |
| Phosphate | 100 |
| Bentonite | 50 |
| Alfalfa meal | 5 |
| Iron sulphate | 5 |
| Wheat germ | 1 |
| Molasses | 70 |
| | 2200 |

The side walls of die 51 were maintained at 250° F. in the formation of a so-called 39% formula protein block made in accordance with the following formula:

*Formula 3.—250 degrees heat used, 39% protein*

| | Lbs. |
|---|---|
| Cottonseed meal | 600 |
| Soybean meal | 675 |
| Salt | 330 |
| Urea | 120 |
| Gluten feed | 150 |
| Meat scraps | 100 |
| Calcium carbonate | 100 |
| Phosphate | 125 |
| Bentonite | 50 |
| Bone meal | 25 |
| Alfalfa meal | 5 |
| Wheat germ | 5 |
| Vit. A | 2 |
| Vit. D | 2 |
| Trace minerals | 5 |
| Molasses | 85 |
| | 2400 |

Generally speaking we have found that the greater the heat applied to the die 51 through the heating elements 58, the softer the block.

The block 10, formed with the hole 11, will be forced at a predeterminoed continuous rate from the end of the die 51. The tapered core 66 relieves pressure built up within the die 51 and the bore 11 has the added purpose of providing suitable means for the escape of steam and heat.

The continuously formed block is adapted to be cut off at regular intervals by cut-off saw assembly 81. We illustrate, more or less schematically, one form of such a suitable saw or cut-off assembly and it is to be understood that any suitable mechanism may be utilized for this purpose.

The block 10 is supported by a floor extension 82 to the lower wall of the die assembly 51 as illustrated generally in FIGURE 6 and this extension 82 serves to support the expelled block as the same passes from the end of the die 51. The saw assembly consists generally of a circular saw 83 which is mounted upon shaft 84 and adapted to be driven by motor 86. Motor 86 and saw 83 are adapted to be actuated vertically from a fully retracted position, illustrated in FIGURE 9, to a fully lowered cutting position, illustrated in FIGURE 10, and then to be returned to the raised or retracted position illustrated in FIGURE 9. The entire saw cut-off assembly is normally in the general position illustrated in FIGURE 6 (with the blade 83 in elevated position, however). As the block 10 is advanced along the lower wall 82 it comes into engagement with a trigger or actuating mechanism 89. When the block engages the trigger or actuating mechanism 89, a control circuit is closed whereby the entire assembly 81 is moved to the right as indicated in FIGURE 6 and the saw blade 83 is lowered. The gripping shoes 87 and 88 will simultaneously be actuated to engage the expelled block and to hold the same while the blade 83 is lowered. When the blade 83 has severed the block and reaches the end of its downward stroke the shoes 87 and 88 are caused to disengage the block with the result that the severed block will drop upon rollers 91 and be carried from the machine to a receiving station. The blade 83 will be raised and the entire assembly 81 will be stopped and returned generally to the position illustrated in FIGURE 6 (but with blade 83 raised). The saw blade will continue to rotate and the device will remain in this position until a sufficient length of block has been expelled from the die 51 and it again engages the trigger 89 with the result that the shoes 87 and 88 will engage the block, the saw blade 83 will be lowered and the entire carriage 81 will be moved to the right, as viewed in FIGURE 6, all as has previously been described, with the result that another predetermined length of block will be severed. This cut-off device does not form an integral part of our invention and therefore it and its mode of operation are described only schematically.

Operation of the entire apparatus may briefly be described as follows. The members 38, 39 and 41 are all caused to be driven and the desired mix introduced through the hopper 37 and ultimately fed into the conveyor 41. Suitable molasses, water or binder may also be introduced, all as has previously been described.

The heating elements 58 are connected to a suitable source of electric current and the die 51 is brought to the proper temperature dependent upon the mix being used and the degree of hardness desired from the finished block.

Generally, by the time the mix is introduced into the die assembly 51, it will have attained a temperature of approximately 165° F. simply by virtue of its having been compressed by the flight 44.

As the mix is urged into the die 51 it flows about the core 66 and into intimate contact with the inner surfaces of the side walls of the member 51. Heat generated within the block 10 in the die assembly 51 is exhausted in the form of steam through the bore 11. When the device is in operation a steady flow of steam is exhausted through bore 11.

As the block 10 is expelled from die 51, it may be cut off in predetermined lengths by the utilization of the cut-off assembly 81 previously described.

We claim:

1. In a device for the continuous manufacture of substantially solid compressed blocks of radially uniform density from the interior to the exterior, apparatus comprising a feed housing, means intermixing and conveying the ingredients of said block including a screw having a shaft and flight thereon received in said housing, said housing having a portion of substantially uniform cross-section receiving said screw, means forming an elongated extrusion die of substantially uniform transverse cross-sectional area corresponding generally to that of said housing at the discharge end of said housing, the outlet end of said die being normally unobstructed to permit the blocked material to normally flow unimpeded from the die, and a tapered core member having an unobstructed exterior surface extending longitudinally thereof to permit material to slide over said core member, said tapered core member being formed as an extension of said shaft and extending beyond the end of said flight into said die in such fashion as to radially inwardly relieve compression within a mass of intermixed block material entering the die, said screw serving to receive and feed said mixed ingredients continuously into said die and compress the materials therein into substantially solidified form, said core member including a first portion of sharply diminishing diameter commencing at the entry end of said die and a second portion of less sharply diminishing diameter to further diminish the diameter of the core along the length of the die at an interior portion of said die, and heating means supported adjacent the side walls of the die adapted to provide controlled heating substantially along the entire length thereof to condition the exterior surface of the block forming materials within the die and surrounding said tapered core member whereby the screw and tapered core effectively cooperate with the interior surfaces of the die to control the densification of the block while imparting characteristics of uniform radial density within the condensed block of material.

2. In a device for the continuous manufacture of substantially solid compressed blocks of radially uniform density from the interior to the exterior, apparatus comprising a feed housing, means intermixing and conveying the ingredients of said block including a screw having a shaft and flight thereon received in said housing, said housing having a portion of substantially uniform cross-section receiving said screw, means forming an elongated extrusion die of transverse polygonal configuration and substantially uniform transverse cross-sectional area along the length thereof, said area corresponding generally to that of said housing at the discharge end of said housing, the outlet end of said die being normally unobstructed to permit the blocked material to normally flow unimpeded from the die, and a tapered core member having an unobstructed exterior extending longitudinally thereof to permit material to slide thereacross, said tapered core member being formed as an extension of said shaft and extending beyond the end of said flight into said die in such fashion as to radially inwardly relieve compression within a mass of intermixed block material entering the die, said screw serving to receive and feed said mixed ingredients continuously into said die and compress the materials therein into substantially solidified form, said core member including a first portion of sharply diminishing diameter commencing at the entry end of said die and an elongated tapered portion of more gradually diminishing diameter, the last named tapered portion being disposed along the length of the die at an interior portion of said die, the last named tapered portion of the core having a longitudinal dimension along the axis of the die substantially greater than that of said first portion, and heating means supported adjacent the side walls of the die and extending therealong, the heating means being adapted to provide controlled heating substantially along the entire length of the die to condition the exterior surface of the block-forming materials within the die and surrounding said tapered core member whereby the screw and tapered core effectively cooperate with the interior surfaces of the die to control the densification of the block while imparting characteristics of uniform radial density within the compressed block of material.

3. In apparatus for forming relatively large substantially solidified blocks of matter, a hollow die open from one end to the other forming a bore therethrough of substantially uniform transverse cross-section for the continuous flow of blocked material moving through the die, screw means including a shaft and flight thereon for continuously feeding material to be blocked into one end of said bore under a substantial applied heat-generating pressure and to apply a driving and compacting force to said material to move it through the bore of the die, said die having a smooth continuous interior surface forming said bore, said bore being formed and dimensioned to be otherwise subject to compacting the block forming material within the bore to the point of refusal for said material to further move through the bore under urging of said screw means, means for selectively regulating the compaction of blocks being formed by controlling the point of release of compacted material within the bore to maintain the continuous flow of the blocked material through the bore to emerge therefrom in a substantially solidified form continuously and having characteristics of substantially uniform density radially of the longitudinal axis of the blocked material, the last named means for selectively regulating the point of release of compacted material within the bore comprising a tapered core member having an exterior substantially unobstructed longitudinally therealong to permit material to slide thereacross, said tapered core member being formed as an extension of said shaft and extending beyond the end of said flight into said die in such fashion as to radially inwardly relieve compression within a mass of intermixed block material entering the die, said screw means serving to receive and feed said material continuously into said die and compress the material therein into substantially solidified form, the tapered core member including a first portion of sharply diminishing diameter commencing at the entry end of said die and a second portion of less sharply diminishing diameter to further diminish the diameter of the core along the length of the die at an interior portion of said die, an elongated heating means supported adjacent the side walls of the die adapted to provide controlled heating substantially along the entire length thereof to condition the exterior surface of the block being formed adjacent the heated side walls with respect to the interior surface of the die to control slippage therebetween to vary the densification of the block by controlling the point of release of compacted material within the bore.

References Cited by the Examiner

UNITED STATES PATENTS

| | | | |
|---|---|---|---|
| 422,370 | 3/1890 | Brott | 99—8 |
| 517,510 | 4/1894 | Adamson. | |
| 657,607 | 9/1900 | Luzatto | 100—74 |
| 704,698 | 7/1902 | Edison. | |
| 785,637 | 3/1905 | Schlickeysen. | |
| 824,008 | 6/1906 | Gowdy. | |
| 1,572,629 | 2/1926 | Welton | 44—12 |
| 1,881,171 | 10/1932 | Cooley. | |
| 2,205,865 | 6/1940 | Schwarzkorf. | |
| 2,223,904 | 12/1940 | Zentz | 99—8 |
| 2,261,224 | 11/1941 | Christensen | 99—235 |
| 2,332,170 | 10/1943 | Sapp. | |

(Other references on following page)

| | UNITED STATES PATENTS | | |
|---|---|---|---|
| 2,641,042 | 6/1953 | Kopp | 25—107 |
| 2,642,643 | 6/1953 | Montague. | |
| 2,649,618 | 8/1953 | Rhodes et al. | |
| 2,786,760 | 3/1957 | Bonnafoux | 99—2 |
| 2,801,173 | 7/1957 | Devareaux | 99—2 |
| 2,962,786 | 12/1960 | Hawk et al. | 25—1 |
| 2,970,532 | 2/1961 | Skelton | 99—235 |
| 3,054,343 | 9/1962 | Pellett. | |

| | FOREIGN PATENTS | |
|---|---|---|
| 570,097 | 2/1959 | Canada. |
| 27,848 | 12/1955 | Finland. |
| 44,266 | 5/1908 | Switzerland. |
| 69,677 | 1/1915 | Switzerland. |

WALTER A. SCHEEL, *Primary Examiner.*

A. LOUIS MONACELL, *Examiner.*